July 25, 1972        H. W. DIAMOND        3,679,375
SALT PRODUCTION PROCESS
Filed Sept. 4, 1970
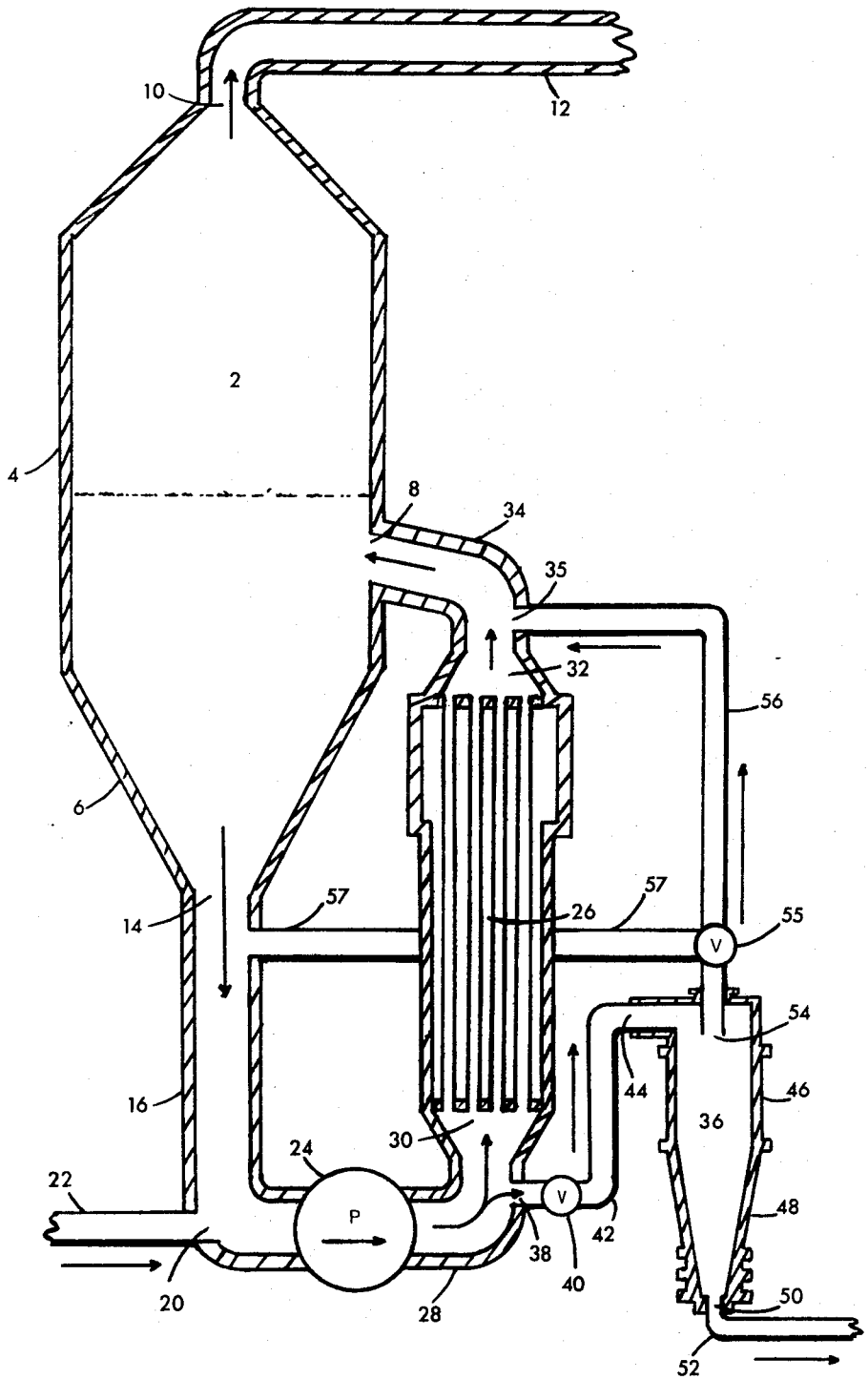
INVENTOR.
HORACE W. DIAMOND
BY

United States Patent Office 3,679,375
Patented July 25, 1972

3,679,375
SALT PRODUCTION PROCESS
Horace W. Diamond, Flossmoor, Ill., assignor to Morton-Norwick Products, Inc., Chicago, Ill.
Filed Sept. 4, 1970, Ser. No. 69,868
Int. Cl. C01d 1/30
U.S. Cl. 23—303
2 Claims

ABSTRACT OF THE DISCLOSURE

A process and apparatus for crystallizing and separating crystalline salt from brine involving in sequence heating said brine in a heater, conducting the resulting heated brine to an evaporating chamber, evaporating off water thereby causing nucleation and crystallization of salt in said brine to form a slurry, removing said slurry from said chamber to said heater for recirculation, bleeding a portion of said slurry into a centrifuging zone, centrifugally separating therein crystalline salt from said slurry, conducting the resultant supernatant brine to the evaporating chamber for recirculation, and discharging said crystalline salt from said centrifuging zone for collection.

BACKGROUND OF THE INVENTION

Field of the invention

The field of this invention is generally the production of crystalline salts by the evaporation of the aqueous solutions of those salts. The term "salt" as used herein refers to any water soluble inorganic compound which upon ionization in water yields cations and anions. Aqueous solutions of salt are hereinafter referred to as "brine." One problem in this process is to separate salt from a salt-brine mixture (hereinafter referred to as "slurry"). As water is evaporated from brine, it becomes supersaturated and results in nucleation and crystallization of salt. This evaporation conventionally takes place in evaporating chambers which are heated, usually by steam.

In a manufacturing process using an evaporating chamber, saturated brine is introduced into a heating chamber, which may be either inside or outside of the evaporating chamber. After heating, the hot brine is directed to the surface of the brine already present in the evaporating chamber. At the surface, water evaporates (flashes) and passes out of the evaporating chamber as steam. Nucleation and crystallization of salt then occur. Depending upon the specific conditions of rate of flashing, degree of supersaturation, turbulence, additives, and rate of removal of crystalline salt, the salt crystals grow to a variety of sizes and forms. Generally, the very fine crystals and the large coarse crystals are both undesirable end products. This is especially true of modified sodium chloride crystals which become very fragile when coarse. After the crystals have grown to a desired size they must be separated from the brine for collection.

Description of prior art

Evaporators conventionally have a salt settling leg for collecting crystalline salt, or their slurry contents are emptied into a salt settling chamber in order that crystalline salt may be removed from the brine.

Settling chambers are costly capital investments and result in a great amount of heat loss thereby causing considerable inefficiency. They also afford little control over crystal size. Accordingly, salt settling legs are conventionally used as a means of separating the crystalline salt from the evaporating chamber.

A salt settling leg in an evaporator does, however, result in a number of difficulties. In order to have proper collection of salt in the salt settling leg, the brine outlet leading to a heater must be located well above the lowest portion of the evaporating chamber which leads to the settling leg. The heated brine inlet is conventionally below the surface of the brine in the evaporating chamber and is therefore relatively close to the brine outlet. This positioning of the outlet and inlet results in a certain amount of "short circuiting" of brine (i.e. brine from the heater returns to the heater without having flashed at the surface). Such "short circuiting" causes the temperature of the brine to increase without a corresponding increase in the production of salt thereby decreasing the overall efficiency of the process and also reducing the effectiveness of the heater. In order to overcome this reduced effectiveness either the heating surface or the power must be increased.

Because of the turbulence in the evaporating chamber many of the salt crystals reach a relatively large size before the salt crystals will drop into the settling leg. In order to extract the salt from the salt settling leg it must be periodically emptied. Salt lumps which form on the walls of the evaporating chamber may come loose and settle in the pan leg and interfere with salt removal. In addition, in order to dissolve these lumps of salt which block the flow of the slurry from the leg, backwashing with water is periodically required. Backwashing causes a further loss in efficiency as it dissolves crystals which have already been formed. Supervision at this stage is required. The manpower required to maintain proper functioning of an evaporator having a salt settling leg is costly and undesirable. For a variety of reasons including the periodicity of salt removal there are variations in the concentration of particulate salt in brine of conventional systems. These variations of concentration cause an undesirable variation in the size of salt crystals. Large and very small size salt crystals are not desired as an end product. Also, construction of a salt settling leg with its required valves and controls is expensive and undesirable.

It is therefore an object of the present invention to provide a process and apparatus for the manufacture of salt wherein "short circuiting" would be greatly reduced or eliminated.

It is a further object of the present invention to provide a method and apparatus for the manufacture of salt which would reduce the capital costs of a salt producing apparatus.

It is also an object of the present invention to provide a method and apparatus for the manufacture of salt of a desired crystal size which requires little manual supervision and/or control.

It is also an object of the present invention to provide a method and apparatus for the manufacture of salt which eliminates the need for backwashing and dissolving crystallized salt.

It is a further object of the present invention to provide a method and apparatus for the manufacture of salt wherein a relatively constant concentration of particulate salt in brine can be maintained in the evaporating chamber.

SUMMARY OF THE INVENTION

In one broad form the present invention comprises a process and apparatus for obtaining crystalline salt from brine. The inventive process comprises heating said brine in a heater, conducting the resulting heated brine to an evaporating chamber, evaporating off water thereby causing nucleation and crystallization of salt in said brine to form a slurry, conducting said slurry from said chamber to said heater for heating and recirculation, bleeding a portion of said slurry being conducted to said heater into a centrifuging zone, centrifugally separating therein crystalline salt from said slurry, conducting the resulting supernatant brine to the evaporating chamber for recirculation, and passing said crystalline salt from said centrifuging zone to a filter for collection. The rate of recirculation should be maintained such that the crystalline salt entering the centrifuging zone is from about 1 to about 15 percent by weight of said slurry, the desired rate being dependent upon the size crystal desired and whether the crystals are cubic or modified. A more optimum range for the crystalline salt is from about 2 to 5 percent.

For the purposes of illustration, the centrifuging zone is described by reference to a centrifuging apparatus known in the trade as a "cyclone." However, any economic centrifuging apparatus can be used. The cyclone can be designed to provide the centrifugal force to permit extraction of the maximum size crystal desired. Higher centrifugal force removes all size crystals while a lower centrifugal force removes only larger size crystals. The flow through the cyclone is adjusted to give the pan slurry concentration desired. A suspension of low salt content will give a finer salt than a suspension of high salt content since the time the salt crystals are present in the evaporating chamber is reduced. Use of a cyclone for separation of crystalline salt from the brine has a number of distinctive advantages over the use of a salt settling leg in an evaporating chamber. Because the inlet and outlet for the cyclone are external to the evaporation chamber they do not in any way interfere with the flow of brine and slurry in the evaporating chamber. Thus, the slurry discharge port can be located at the very bottom portion of the evaporating chamber while the brine inlet is located near the surface of the brine in the chamber. By so positioning these openings "short circuiting" is virtually avoided. Also the crystalline salt removed from the brine is self-regulating both as rate of removal and as to crystal size. In addition, by avoiding the accumulation of salt lumps in the settling leg backwashing is not required.

Sufficient velocity of slurry flow through the cyclone will selectively remove small salt crystals (exclusive of fines) from a low concentration of salt in brine. Thus, the need for a high salt concentration in brine with its attendant larger size crystalline particles is avoided. Also, as a build up of crystalline salt occurs in the slurry the cyclone automatically extracts more salt. When the build up of crystalline salt in the slurry drops, the extraction by the cyclone also automatically drops. Therefore, the level of concentration of crystalline salt in brine remains relatively constant. The amount of slurry that is bled through the cyclone determines the concentration of particulate salt in brine. The cost of installing a cyclone is considerably less than the cost involved in installation of a salt settling leg with its required controls and valves.

The invention also relates to apparatus for carrying out the above process.

BRIEF DESCRIPTION OF THE DRAWING

The figure is a schematic illustration in partial section of the recovery apparatus of the present invention for providing particulate salt, for example, sodium chloride, comprising an evaporating chamber 2 having a cylindrical body portion 4, a conical (inverted) bottom portion 6, heated brine inlet 8, steam outlet 10 which empties into conduit 12. Conduit 16 having brine inlet 20 from conduit 22 connects slurry discharge outlet 14 with pump 24. Pump 24 further communicates the lower portion of heater 26 via conduit 28 and heater inlet port 30. The upper portion of heater 26 empties through heater outlet port 32 into conduit 34 which has return port 35 and communicates with evaporating chamber 2 through inlet 8. Conduit 28 further communicates with cyclone separator 36 through bleed port 38, valve 40, conduit 42 and slurry feeding port 44. Cyclone separator 36 has a cylindrical body portion 46, a conical (inverted) bottom portion 48, crystalline solid discharge port 50 which empties into conduit 52, and supernatant discharge port 54 which via valve 55 and conduit 56, and return port 35, communicates with conduit 34. Alternatively, discharge port 54 communicates with conduit 16 via valve 55 and conduit 57.

In Operation.—Brine is heated in heater 26 then passed through heater outlet port 32 through conduit 34 into evaporating chamber 2 at heated brine inlet port 8. Reduced pressure in evaporating chamber 2 causes evaporation (flashing) of water thereby causing nucleation and crystallization of salt in brine. The water vapor is discharged through steam outlet port 10 and conduit 12. Said crystallization in the brine forms a slurry which collects in lower portion 6 of evaporating chamber 2 and is drawn through slurry discharge port 14 and conduit 16 by pump 24. Also, fresh brine is drawn from conduit 22 through port 20 into conduit 16 by pump 24 thereby mixing with the slurry from the evaporator 2. Said slurry is then forced through conduit 28 via heater inlet port 30 into heater 26 for heating and recycling. A portion of said slurry is bled from conduit 28 at bleed port 38 through valve 40 and conduit 42 whereafter it is injected into cyclone separator 36 at slurry feeding port 44. The high velocity of the slurry in combination with the mechanical configuration of cyclone separator 36 causes a downward spiralling flow of slurry thereby creating a centrifugal force which causes solid particles to flow downward, and out crystalline solid discharge port 50 into conduit 52 from which it is collected. Lighter brine is displaced upward and flows through the center portion of the downward flowing slurry until it is discharged through supernatant discharge port 54 into conduit 56, and through return port 35, is discharged into conduit 34. Alternatively, the lighter brine may be returned to pump 24 via valve 55 and conduits 57 and 16.

Though the embodiment of the invention here illustrated indicates an external heater, either an internal heater known to the trade as a "Calandria" or an external heater may be used. Also, the introduction of fresh brine may occur at any point in the system.

I claim:

1. A process for the preparation of sodium chloride which comprises circulating a sodium chloride brine through a heating zone, passing the heated brine into an evaporating zone to cause crystallization of said salt to form a slurry, removing a portion of the total resulting slurry from the evaporating zone, returning a first portion of said removed slurry portion to said heating zone for recirculation, conducting a second portion of said removed slurry portion to a centrifuging zone, centrifuging therein said second slurry portion to cause separation of salt therefrom, removing the resulting supernatant slurry from said centrifuging zone and recycling the same through said evaporation zone, the rate of recirculation being maintained at a level such that the crystalline sodium chloride entering said centrifuging zone is approximately 1 to 15 percent by weight of said slurry.

2. The process according to claim 1 wherein the rate of recirculation is maintained at a level such that the crystalline salt entering said centrifuging zone is approximately 2 to 5 percent by weight of said slurry.

References Cited

UNITED STATES PATENTS

| 988,002 | 3/1911 | Lillie | 23—301 |
|---|---|---|---|
| 2,207,347 | 7/1940 | Hughes | 23—273 |
| 3,347,073 | 4/1944 | Beek Huis, Jr. | 23—301 |
| 3,141,743 | 7/1964 | Marsh | 23—301 |
| 3,230,050 | 1/1966 | Patterson | 23—273 |
| 3,443,888 | 5/1969 | Calbeck | 23—273 |
| 3,503,803 | 3/1970 | Bennett et al. | 23—273 |

OTHER REFERENCES

"Crystallyers," Chem. Eng.—October 1950, Thompson, pp. 125–132.

NORMAN YUDKOFF, Primary Examiner

S. SILVERBERG, Assistant Examiner